Figure 1:
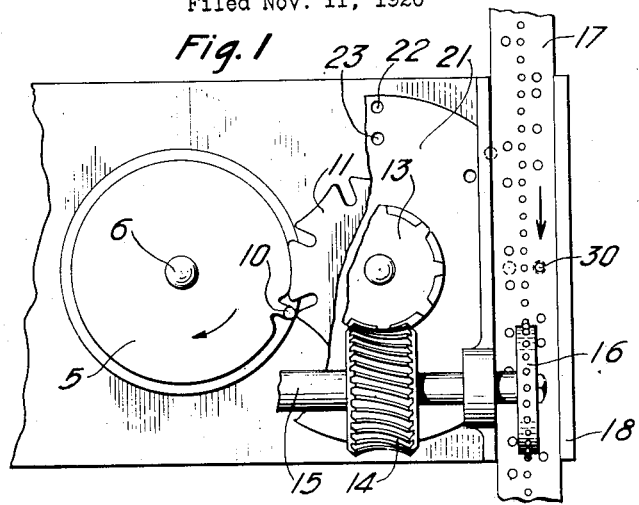

Aug. 18, 1925.

A. A. CLOKEY

TELEGRAPHY

Filed Nov. 11, 1920

1,549,907

Inventor:
Allison A. Clokey
by Joel C. R. Palmer
Att'y.

Patented Aug. 18, 1925.

1,549,907

UNITED STATES PATENT OFFICE.

ALLISON A. CLOKEY, OF RUTHERFORD, NEW JERSEY, ASSIGNOR TO WESTERN ELECTRIC COMPANY, INCORPORATED, OF NEW YORK, N. Y., A CORPORATION OF NEW YORK.

TELEGRAPHY.

Application filed November 11, 1920. Serial No. 423,295.

*To all whom it may concern:*

Be it known that I, ALLISON A. CLOKEY, a citizen of the United States of America, residing at Rutherford, in the county of Bergen, State of New Jersey, have invented certain new and useful Improvements in Telegraphy, of which the following is a full, clear, concise, and exact description.

This invention relates to telegraph systems and has particular reference to the equipment employed for transmitting telegraphic signals over signaling conductors possessing high electrostatic capacity, such as for example, submarine cables.

In systems of telegraphy utilizing the principle of the selenium cell or other photoelectric sensitive element for telegraphic communication by means of impulses of different duration and polarity, considerable difficulty has been experienced heretofore in differentiating signals following in close succession. This has been found to be due to the continued application of the radiant energy to the selenium cell or other photoelectric sensitive element after the signaling impulse of the proper duration has been transmitted to the signaling conductor. To obviate this difficulty, the present invention provides means whereby the selenium cell or other light sensitive cell will be restored to its normal state, in cases employing automatic transmission, the instant the tape or other transmitting medium is set in motion to position the next succeeding set of perforations in alignment with the light sensitive cells.

An object of the invention is, therefore, the provision of an improved transmitting mechanism for controlling the application of radiant energy to light sensitive cell whereby signaling current impulses of the proper duration and polarity will be applied to the terminal of the signaling conductor.

Another object is the provision of a system which is efficient and reliable in operation, for correctly and accurately effecting the transmission of telegraphic signals. It is also an object of the invention to provide means for effectively associating radiant energy sensitive devices and space discharge relays. Other objects of the invention will appear hereinafter.

In accomplishing the above objects the present invention in its preferred form contemplates the provision of a transmitting mechanism incorporated with means for controlling the application of radiant energy to an element sensitive thereto in accordance with the perforations in a transmitting tape. Specifically, the invention provides a shutter or disc arrangement operatively connected to a train of gears, and having perforated therein a set of holes, whereby upon each movement of the gear train, the shutter will be positioned so that a set of holes therein will coincide with the perforations in the transmitting tape. The mechanism is also arranged so that the radiant energy will be cut off from the light sensitive cell during the interval of time in which the tape is in motion.

Figure 2:
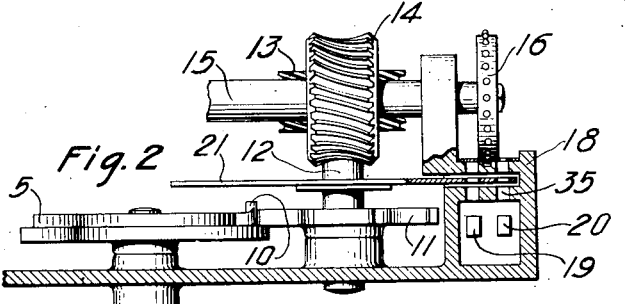
Figure 3:
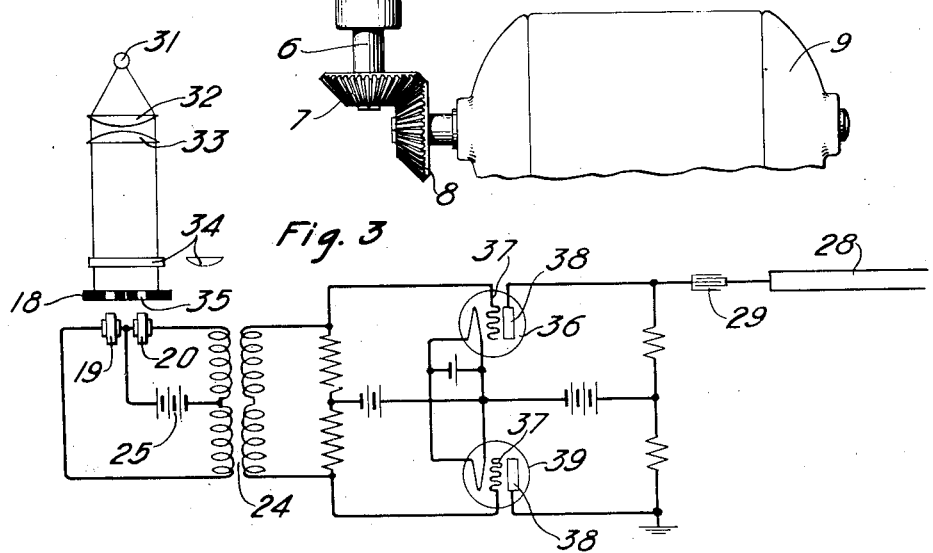

The invention is illustrated in the accompanying drawing, wherein Fig. 1 shows a plan view of a transmitting mechanism suitable for accomplishing the above object. Fig. 2 shows a side elevation of the mechanism illustrated in Fig. 1, while Fig. 3 shows in schematic form a circuit arrangement adapted to be used in connection with a transmitting mechanism of the type hereinafter described, although it is not intended to limit the invention to the particular circuit arrangement disclosed.

Fig. 1 shows a shutter mechanism for controlling the application of a source of light to a pair of light sensitive cells. The mechanism comprises a continuously revolving member 5 suitably mounted at one extremity of shaft 6. At the other extremity of the shaft 6 is a bevel or miter gear 7 arranged to mesh with a similar gear 8 mounted on the shaft of a motor 9. Secured to the member 5 is a pin 10, which is arranged to cooperate with the teeth in a gear member 11. The member 11 forms the intermediate gear of the gear train and is secured to a shaft 12, which has secured at one extremity thereof a helical gear 13, which is designed to mesh with an associated gear 14, rigidly secured to a shaft 15. At one extremity of the shaft 15 is secured a feed wheel 16, which is designed to engage the central row of perforations in a transmitting tape 17 for controlling the movement thereof, in the direction of the arrow. The tape 17 moves over a table 18, in which is formed a set of holes coinciding with the perforations in the transmitting tape representing the signals to be transmitted.

As in the usual form of transmitting tape, two sets of perforations are employed, one representing a dot signal, the other a dash. When the tape is advanced the holes therein will coincide with those in the table over which it is at that instant positioned. Beneath the respective holes in the table are located light sensitive cells 19 and 20, respectively, so that radiant energy may be applied to the cell over which a perforation in the transmitting tape is positioned.

In order that the light may be cut off from the cells when the perforations in the transmitting tape closely follow each other, a shutter 21 is provided. This shutter has a set of holes 22 and 23 for each tooth of the gear 11, these holes being so located that they will coincide with the perforations in the transmitting tape 17 representing a dot and dash, respectively. During the time the tape 17 is in motion, all of the light will be cut off from the cell by means of this shutter, since it is arranged in conjunction with the gear 11 and is moved upon the engagement of the pin 10 with a tooth in this gear, the pin 10 engaging a tooth in the gear 11 for each revolution of the member 5. In order that the tape 17 and the shutter 21 will be moved in unison the gears 13 and 14 are so proportioned that the feed wheel 16 will be moved so as to advance one tooth each time the gear member 11 is advanced one tooth. Thus, a source of light suitably arranged over the perforations in the table 18 will be permitted to act on the cells 19 and 20 upon the positioning of the transmitting tape and the shutter 21, so that the respective holes coincide with those in the table 18.

Referring now to Fig. 3 which shows in schematic form a circuit arrangement suitable for use in connection with a transmitting mechanism of the type heretofore described. The cells 19 and 20 are connected with the primary winding of a transformer 24, with which there is associated a suitable source of battery supply 25. The circuits including the cells 19 and 20, respectively and a portion of the primary winding of the transformer 24 is balanced so that normally no current flows in the secondary circuit of the transformer. To the secondary winding of the transformer 24 a pair of audions of the thermionic type are connected, the plate circuits of the audions being connected to the terminal of the cable 28 through the usual sending condenser 29. Upon the positioning of the transmitting tape 17 in a manner whereby a perforation such as 30 is positioned over the corresponding hole in the table 18, light rays from the source 31 will be applied to the cell 20. The source of light 31 may be an incandescent lamp which has been found to satisfactorily serve the purposes, although other sources of light of a greater intensity than that of the incandescent lamp may be employed without departing from the spirit and scope of the invention. The rays of light from the source 31 thus pass through the lenses 32, 33 and 34, the perforation 30 in the transmitting tape 17, the hole 22 in the shutter 21, and the hole 35 in the table 18 to the cell 20. The resistance of the cell 20 is thus reduced in value whereby current is caused to flow in the portion of the primary winding of the transformer 24 including this cell. Likewise current is caused to flow in the secondary winding of this transformer, which will be in such a direction as to render the audion 36 effective for applying to the terminal of the cable 28 an impulse corresponding with the desired signal. When current is caused to flow in the secondary winding of the transformer 24, due to a variation in the resistance of the circuit including the cell 20, the charge on grid electrode 37 of the audion 36, which under normal conditions is such as to reduce the current in the input circuit to zero, will be increased, while the charge on grid electrode 37 of the tube 38 is decreased. Current in the output circuit of the tube 36 is thereby caused to flow. This current will be in such a direction as to apply to the terminal of the cable 28 through the condenser 29 an impulse representing a dash signal.

If a perforation is positioned over the cell 19, light from the source 31 will thereby render the resistance of this cell effective for causing an increased current to flow in its respective circuit, current being thereupon caused to flow in the secondary winding of the transformer 24 for causing the operation of the audion 39 in the same manner as described for the audion 36. However, in the latter case the current in the output circuit of the audion is in a direction opposite to that of the audion 36, and an impulse representing a dot signal will be applied to the cable 28.

It will be obvious to one skilled in the art that although the invention is particularly described with reference to a telegraphic transmitter, it is applicable also to other forms of apparatus in which a moving record is employed to control the impression of radiant energy upon the device sensitive thereto for the control of an electric circuit. Moreover, certain features of the invention, as expressed in some of the claims, are not limited to the use of a record or means for permitting the recovery of the radiant energy device from fatigue, but relate to the association of radiant energy sensitive devices with space discharge repeaters.

What is claimed is:

1. A source of radiant energy, an element having its resistance dependent upon the amount of incident radiant energy and subject to fatigue, a record comprising portions more conductive to radiant energy from said source than other portions, means for moving said record relatively to said source and said element for causing variations of the energy impressed on said element from said source and resultant variations of the resistance of said element corresponding with said record, and means, operated in synchronism with the movement of said record, for periodically and automatically shadowing said element to permit it to recover in part at least from fatigue.

2. The combination with a radiant energy sensitive element, of means for emitting radiant energy toward said element, a moving member between said radiant energy element and said source to control the impressing of energy upon said element, and a second moving element, operated in synchronism with the movement of said first moving member, for intermittently shadowing said radiant energy sensitive element to permit it to recover in part at least from fatigue.

3. A device for producing current flow in a circuit including a radiant energy element, a perforated tape, a disc having a plurality of apertures spaced at equal intervals apart, and means for controlling the simultaneous movement of said tape and disc to a position whereby radiant energy is permitted to act on said element.

4. A device for producing current flow in a circuit including a pair of radiant energy elements, a perforated tape, a disc having a plurality of apertures therein spaced at equal intervals apart, and means for controlling the simultaneous movement of said tape and disc to a position whereby radiant energy is permitted to act on one or the other of said elements.

5. A device for producing current flow in a circuit including a radiant energy element, a perforated tape, a disc having a plurality of apertures therein spaced at equal intervals apart, and a continuously operated member for simultaneously moving said tape and disc to a position whereby radiant energy is permitted to act on said element.

6. An automatic transmitter of telegraphic signals comprising a pair of radiant energy devices, a transmitting tape having two rows of perforations representing dot and dash signals respectively, a disc having a plurality of sets of apertures, a gear wheel secured to said disc and provided with a tooth for each set of apertures therein, and a continuously revolving member arranged to move said wheel once per revolution thereof, whereby the apertures in said disc coincide with the perforations in said tape for permitting the application of radiant energy to said elements.

7. A telegraphic transmitter comprising a radiant energy element, a source of light adapted to be applied to said element for changing the resistance thereof, a transmitting tape having perforations therein corresponding to the signals to be transmitted, means for excluding the light from said elements, and a continuously operated member arranged to simultaneously move said means and tape into a position wherein said element is rendered effective by rays from said source of light.

8. A telegraphic transmitter comprising a radiant energy element, a source of light adapted to be applied to said element for changing the resistance thereof, a transmitting tape having two rows of perforations therein corresponding to the signals to be transmitted, means for excluding the light from said radiant energy element, and means operative for simultaneously moving said tape and means whereby said element is rendered effective for the transmission of a desired signal.

9. A pair of space discharge repeaters, means to be supplied with energy from said repeaters, output circuits for said repeaters balanced with respect to said means, a pair of radiant energy sensitive devices in circuits associated with the input circuits of said discharge devices, the circuits including said radiant energy sensitive devices being normally balanced with respect to said input circuits, and means for affecting said radiant energy sensitive devices in different degrees to upset said balanced relations and cause energy to be supplied to said first mentioned means.

10. A signal transmitting system comprising means for emitting radiant energy, a radiant energy sensitive element having its resistance dependent upon the amount of radiant energy incident thereupon and subject to fatigue, a record having portions more conductive to said radiant energy than other portions, said portions being in a sequence to represent a signal to be transmitted, means for moving said record between said radiant energy emitting means and said sensitive element for causing variations of the resistance of said element corresponding to said record and means, operated in synchronism with the movement of said record, for periodically and automatically shadowing said element to permit it to recover in part at least from fatigue.

11. The combination with a pair of radiant energy sensitive elements having resistance dependent upon the amount of radiant energy incident thereon and subject to fatigue, of means for emitting radiant energy, a record element having a double record, each part of which has portions more conductive to radiant energy than other portions, means for moving said record so that it will pass between said sensitive elements respectively and said radiant energy emitting means, means for intermittently shadowing said sensitive elements to permit them to recover in part at least from fatigue, and means controlled by said radiant energy sensitive elements unresponsive to equal amounts of radiant energy impressed thereupon but responsive to unequal amounts.

12. In a signaling system, a line conductor, a pair of repeaters of the audion type connected with said line conductor, a source of signaling potential, an inductive coupling between said repeaters and said source of potential, and means included in one side of said inductive coupling for causing the operation of one or the other of said repeaters whereby direct current impulses of equal intensity and wave form may be transmitted over said line conductor.

13. In a signaling system, a line conductor, a symmetrical circuit arrangement comprising a pair of repeaters of the audion type, a source of signaling potential, an inductive coupling intermediate said source of signaling potential and said symmetrical circuit arrangement, and radiant energy elements associated with one side of said inductive coupling and said source of potential and rendered effective upon the application of radiant energy rays thereto for causing the operation of one or the other of said repeaters for transmitting over said line direct current impulses of equal intensity and wave form.

14. In a submarine signaling system, a line conductor, a pair of vacuum tubes each having a filament, a grid and a plate electrode, means for normally rendering said tubes inoperative and maintaining said grid electrode negative with respect to said filaments, a source of potential arranged to be associated with the control electrode of either of said tubes, an inductive coupling intermediate said source of potential and said tubes, and a pair of radiant energy elements rendered effective upon the application of radiant energy rays thereto for causing current to flow in the secondary circuit of said inductive coupling whereby one or the other of said vacuum tubes is operated for causing the transmission of desired signals over said cable.

In witness whereof I hereunto subscribe my name this 9th day of November A. D., 1920.

ALLISON A. CLOKEY.